United States Patent
Toyama et al.

[11] Patent Number: 6,001,265
[45] Date of Patent: *Dec. 14, 1999

[54] RECOVERY OF COOLANT AND ABRASIVE GRAINS USED IN SLICING SEMICONDUCTOR WAFERS

[75] Inventors: Kohei Toyama, Shirakawa; Etsuo Kiuchi, Gunma-ken; Kazuo Hayakawa, Takasaki; Shingo Kaburagi; Akio Ashida, both of Tokyo; Takara Ito, Sakai; Kuniaki Noami, Maizuru, all of Japan

[73] Assignees: Shin-Etsu Handotai Co., Ltd., Tokyo, Japan; Mimasu Semiconductor Industry Co., Ltd., Gunma-ken, Japan; Ohtomo Chemical Ind., Corp., Tokyo, Japan; Hitachi Zosen Metal Works Co., Ltd., Kyoto-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/801,927

[22] Filed: Feb. 14, 1997

[30] Foreign Application Priority Data

Feb. 21, 1996 [JP] Japan .................................. 8-033567

[51] Int. Cl.⁶ .................................................. B01D 21/01
[52] U.S. Cl. ........................... 210/712; 210/714; 210/737; 210/773; 210/774; 210/781; 210/787; 210/171; 210/168; 209/5

[58] Field of Search ..................................... 210/638, 639, 210/781, 787, 773, 171, 167, 168, 712, 714, 737, 774; 209/5

[56] References Cited

U.S. PATENT DOCUMENTS

| | | |
|---|---|---|
| 3,948,784 | 4/1976 | Krillic et al. . |
| 3,997,359 | 12/1976 | Dankoff et al. . |
| 4,122,008 | 10/1978 | Allen ....................................... 210/167 |
| 4,409,020 | 10/1983 | Holman, Jr. et al. .................... 210/638 |
| 4,751,006 | 6/1988 | Becker . |
| 4,872,975 | 10/1989 | Benson ................................... 210/171 |
| 5,127,199 | 7/1992 | Blankers et al. ........................ 210/167 |
| 5,578,222 | 11/1996 | Trischuk et al. ....................... 210/773 |
| 5,647,989 | 7/1997 | Hayashi et al. ........................ 210/641 |

FOREIGN PATENT DOCUMENTS

| | | |
|---|---|---|
| 147541A2 | 7/1985 | European Pat. Off. . |
| 2017517A | 10/1979 | United Kingdom . |

*Primary Examiner*—Robert J. Popovics
*Attorney, Agent, or Firm*—Nikaido, Marmelstein, Murray & Oram LLP

[57] ABSTRACT

A system for reusing water soluble slurry waste fluid wherein separated available abrasive grains and extracted water soluble coolant are reused. This system is capable of reducing a disposal cost due to a reduction of a load to a waste water disposal plant by effectively reusing water soluble slurry waste fluid, and making a contribution to a reduction of a total slicing cost by reusing abrasive grains and water soluble coolant.

14 Claims, 4 Drawing Sheets

RECOVERY OF COOLANT AND ABRASIVE GRAINS USED IN SLICING SEMICONDUCTOR WAFERS

BACKGROUND OF THE INVENTION

1. Field of the Invention

The present invention relates to a system which enables the reuse of water soluble slurry waste fluid used when brittle materials, for example, semiconductor ingots such as compound semiconductor crystal ingots and silicon semiconductor crystal ingots are sliced with a wire saw slicing apparatus.

2. Description of the Related Art

There is known a wire saw slicing apparatus as a means for slicing brittle materials such as compound semiconductor crystal ingots and silicon semiconductor crystal ingots. The wire saw slicing apparatus, as shown in FIG. 4, includes three plastic main rollers 10A, 10B and 10C of the identical construction disposed with their axes parallel spaced from one another, and a wire 12 wound spirally around helical grooves 14a, 14b and 14c formed at regular intervals or pitches in the respective outer peripheral surfaces of the main rollers 10A–10C. The main rollers may be plural in number and should by no means be limited to any particular number, but four or three main rollers as in the illustrated embodiment are 25 used in general. The main roller 10C constitutes a drive roller and is connected in driven relation to a drive motor 16. A rotary motion of the main roller 10C is transmitted via the wire 12 to the remaining main rollers 10A, 10B which constitute driven rollers.

The wire 12 has one or a leading end portion wound around a wire reel bobbin 22 via a tension adjustment mechanism 20. The wire reel bobbin 22 is rotatably driven by a torque motor 24. A tension on a portion of the wire 12 extending between the tension adjustment mechanism 20 and the wire reel bobbin 22 is regulated according to a voltage applied to the torque motor 24. And, a tension on a portion of the wire 12 running between the tension adjustment mechanism 20 and the drive roller 10C is adjusted at a constant value by the tension adjustment mechanism 20.

Similarly, the opposite or a trailing end portion of the wire 12 is wound around a wire reel bobbin 32 via a tension adjustment mechanism 30. The wire reel bobbin 32 is rotatably driven by a torque motor 34. A tension on a portion of the wire 12 extending between the tension adjustment mechanism 30 and the wire reel bobbin 32 is regulated according to a voltage applied to the torque motor 34. And, a tension on a portion of the wire 12 running between the tension adjustment mechanism 30 and the drive roller 10C is adjusted at a constant value by the tension adjustment mechanism 30.

A workpiece 40 is composed, for example, of a semiconductor single crystal ingot having an orientation flat and attached by bonding to a workpiece holder 42 via the orientation flat. The workpiece holder 42 is vertically moved up and down along a linear path.

The wire saw slicing apparatus of the above construction operates as follows. The drive roller 10C is rotated by the drive motor 16 to reciprocate the wire 12 in the axial or longitudinal direction thereof. A working fluid containing abrasive grains is supplied to a contact area between workpiece 40 and the wire 12. While keeping this condition, the workpiece 40 is further moved downwards whereby the workpiece 40 is sliced at one time into a multiplicity of wafers by a lapping action attained by the reciprocating wire 12 and the abrasive-containing working fluid supplied thereto.

An oily slurry, which contains oil (oily coolant) based on mineral oil and abrasive grains as of SiC, is used as the above-mentioned working fluid. However, when this oily slurry is used, there are inconveniences in cleaning a workpiece sliced with the wire saw slicing apparatus, disposing of the used oily slurry or the oily slurry waste fluid, etc. That is, although it is efficient to use an organic solvent in order to clean the workpiece sliced by the use of the oily slurry, the organic solvent can not be used from the viewpoint of an environmental problem. In conventional disposal methods, the oily slurry waste fluid has been predominantly burnt as industrial waste. However, since carbon dioxide ($CO_2$) generated when burning the oily slurry waste fluid is listed as a cause of environmental problems such as earth warming, the burning thereof is not desirable.

Then water soluble coolant has been developed as a substitute of the oily coolant to cope with the environmental problem. A water soluble slurry which contains the water soluble coolant and abrasive grains as of SiC has been recently used as a working fluid when slicing semiconductor ingots or the like with the wire saw slicing apparatus. The newly developed water soluble coolant has a problem that the cost thereof becomes higher because of the following reasons. Since the rate of the abrasive grains which actually contribute to the slicing operation in the total abrasive grains contained in the water soluble slurry is very low, many of the abrasive grains in the water soluble slurry waste fluid after completion of the slicing operation are in the condition of being available or usable. However, this water soluble slurry waste is discarded with such available abrasive grains, and thereby the total slicing cost has been greatly raised. In addition, the water soluble slurry waste fluid is usually treated by an activated sludge method in a waste water disposal plant but a big load to treat the water soluble slurry waste fluid falls thereon. So there is a problem that all of the water soluble slurry waste fluid can not be sent thereto.

SUMMARY OF THE INVENTION

With the foregoing problems in view, it is an object of the present invention to provide a novel system for reusing water soluble slurry waste fluid which is capable of reducing a disposal cost due to a reduction of a load to a waste water disposal plant by effectively reusing water soluble slurry waste fluid, and making a contribution to a reduction of a total slicing cost by reusing used abrasive grains and water soluble coolant.

To achieve the above-mentioned object, the system for reusing water soluble slurry waste fluid comprises the steps of (a) decreasing viscosity of water soluble slurry waste fluid, (b) separating the water soluble slurry waste fluid of low viscosity into available abrasive grains and waste liquid consisting of a suspended solid part and a liquid part; and (c) extracting water soluble coolant from the waste liquid consisting of the suspended solid part and the liquid part, thereafter the suspended solid part being discarded as useless sludge; wherein the separated available abrasive grains and the extracted water soluble coolant are reused.

When reusing the mixture of the separated available abrasive grains and the extracted water soluble coolant, new abrasive grains and new water soluble coolant are preferably replenished to make up for the shortage thereof. The extracted water soluble coolant is preferably turned to regenerated water soluble coolant by controlling the viscosity thereof by adding a dispersing agent, preferably an inorganic dispersing agent, thereto. The viscosity of the water soluble slurry waste fluid which is decreased in the step (a) is 30 mPa·s or less, preferably 20~30 mPa·s with the result that a separator of mass difference type such as a liquid cyclone is applicable.

The viscosity of the water soluble slurry waste fluid is decreased by adding a diluting solution, preferably water and/or a polar solvent such as methanol or by warming the water soluble slurry waste fluid or the diluted water soluble slurry waste fluid added with the diluting solution to the temperature of 40° C. or above. The upper limit of this warming does not exceed the boiling temperature.

The above-mentioned step (b) is carried out with a liquid cyclone so that the separated abrasive grains may contain only available abrasive grains which have grain sizes available for reuse. That is, the separated abrasive grains may be regenerated with such a distribution in grain size as new abrasive grains. The grain size of the available and reusable abrasive grains depends on the kind of the used abrasive grains. When using GC#600 (No.600 count carborundum), the grain size of the available abrasive grain is of 8 μm or more. The available abrasive grain size is optionally determined according to the separating condition of the above-mentioned liquid cyclone.

The operation of extracting the water soluble coolant from the waste liquid in the above-mentioned step (c) is preferably carried out with a coagulation separating operation. The coagulation separating operation preferably comprises the sub-steps of (c1) adding a coagulating agent to the waste liquid consisting of the suspended solid part and the liquid part; (c2) concentrating the liquid part from the waste liquid added with the coagulating agent to form coagulation flocks; (c3) extracting the water soluble coolant by solid-liquid separation of the waste liquid consisting of the suspended solid part adsorbed to the coagulation flocks and the concentrated liquid part, thereafter the suspended solid part being discarded as useless sludge.

The concentration of the liquid part in the abovementioned sub-step (c2) is carried out by distillation or the like. As the moisture rate of the liquid part decreases in the concentration process, the coagulating agent generates coagulation flocks which adsorb the suspended solid part in the waste liquid to develop themselves. Then, the waste liquid is subjected to centrifugal separation so that solid-liquid separation thereof may be easily carried out. There is known an organic coagulating agent or an inorganic coagulating agent as the coagulating agent. For the organic coagulating agent, an anionic agent is more effective than a cationic one, and a polyamide anionic organic coagulating agent is most preferable.

For the water soluble slurry waste fluid to which the present invention is applied, a coagulation effect can be produced by the use of bentonite which is a component of the water soluble coolant. It has been known that bentonite is generally used as a dispersing agent for abrasive grains. As for the water soluble slurry waste fluid to which the present invention is applied, when the temperature thereof is 60° C. or above and the rate of moisture thereof is 60% or less, it is confirmed that bentonite acts as a coagulating agent. Moreover, as to the addition amount of bentonite, 10 ppm aqueous solution of bentonite is preferably added to the water soluble slurry waste fluid in concentration of about 10 wt % thereof. There is also known a method of adding pasted bentonite having a moisture rate of 30~50%. According to this adding method, when concentrating the liquid part by the distillation operation, etc., the amount of the moisture evaporation is decreased and hence there is an effect which leads to a reduction in the electric power energy consumption.

It is confirmed that the organic coagulating agent shows a coagulation effect same as the inorganic coagulating agent such as bentonite. But the organic coagulating agent may change the liquid characteristics such as pH, COD (chemical oxygen demand) and BOD (biochemical oxygen demand) of the water soluble coolant extracted according to the system of the present invention. Therefore, there can be advantageously used without problem the inorganic coagulating agent such as bentonite which is a component of the water soluble coolant in comparison with the organic coagulating agent.

The above and other objects, features and advantages of the present invention will become manifest to those versed in the art upon making reference to the detailed description and the accompanying sheets of drawings.

DETAILED DESCRIPTION OF THE INVENTION

The present invention will be described below in greater detail by way of the following examples which should be construed as illustrative rather than restrictive.

Figure 1:
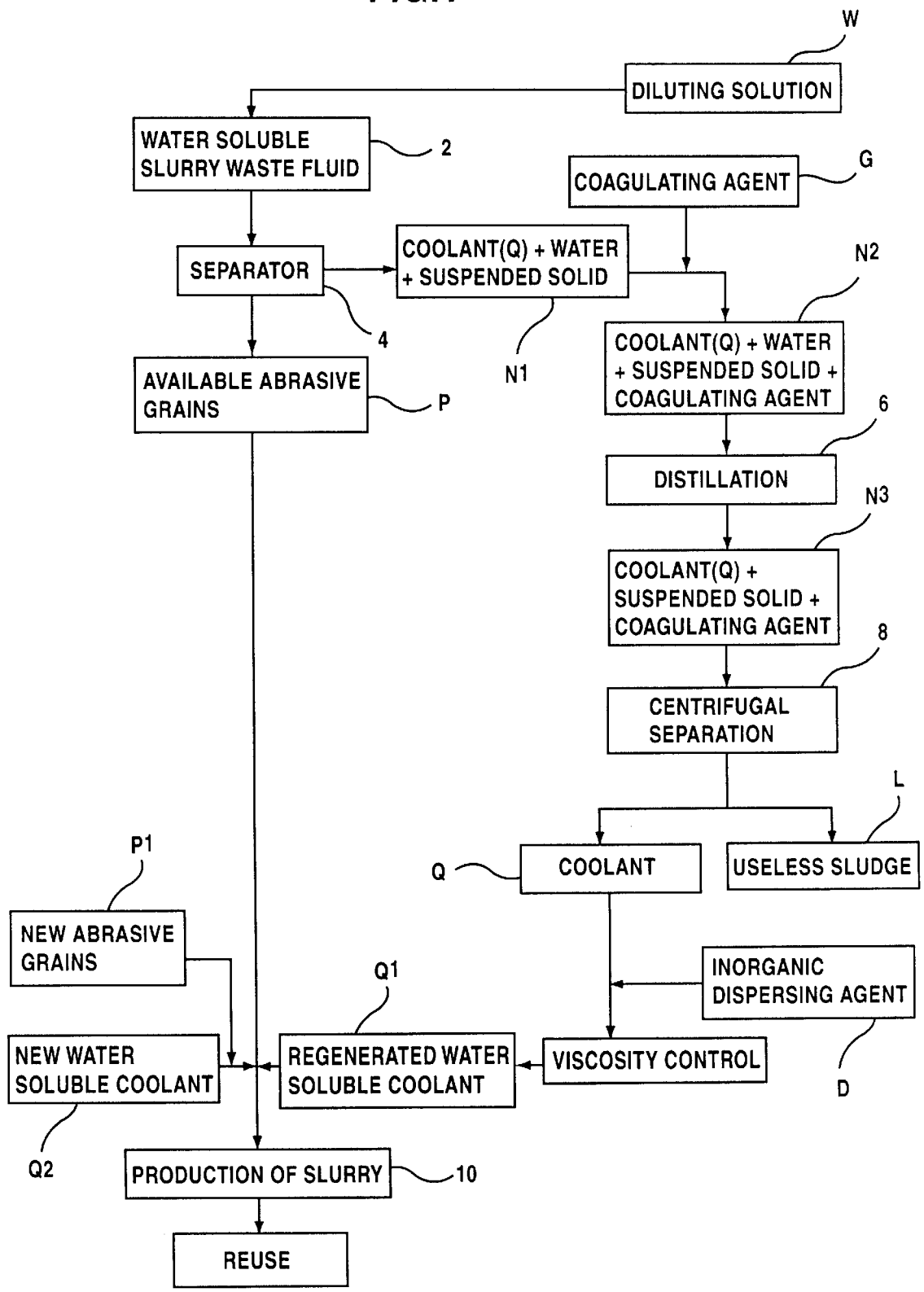
FIG. 1 is a block diagram showing one example of the construction of a system for reusing water soluble slurry waste fluid according to the present invention.

In FIG. 1, numeral 2 is water soluble slurry waste fluid containing used abrasive grains such as GC#600(No.600 count carborundum). The water soluble slurry waste fluid 2 is stored in a waste slurry tank or the like. A water soluble slurry based on water soluble coolant contains dispersed abrasive grains to stably slice a workpiece in the above mentioned slicing operation with a wire saw slicing apparatus. On the demanded quality, the viscosity of the water soluble slurry is adjusted in the range of 50 to 200 mPa·s which is higher compared with the viscosity of general coolant for slicing or grinding. When this water soluble slurry is applied to a slicing process of the workpiece with the wire saw slicing apparatus, slicing scraps thereof are further mixed into the water soluble slurry and hence the water soluble slurry waste fluid has much higher viscosity. Accordingly, it is impossible to separate the water soluble slurry waste fluid in its original condition into solid-liquid phases with a liquid cyclone, a centrifugal separating machine, a filter system or the like which is generally used for such separation.

In the present invention, the water soluble slurry waste fluid 2 is diluted by adding a diluting solution (W) such as water or a polar solvent (methyl alcohol, etc.) of about ½–1 times the volume thereof whereby the viscosity thereof drops to 30 mPa·s or less, preferably within the range of 20 to 30 mPa·s. That is, the step (a) (FIGS. 1 and 2) where the viscosity of the water soluble slurry waste fluid is decreased is first carried out. In order to decrease the viscosity of the water soluble slurry waste fluid, in addition to the above-mentioned diluting method, there is applicable another method where the water soluble slurry waste fluid or the diluted water soluble slurry waste fluid added with the diluting solution is warmed to, for instance, 40° C. or above. The water soluble slurry waste fluid 2 of low viscosity can be subjected to solid-liquid separation of mass difference type such as a liquid cyclone or a centrifugal separator.

As stated above, as a diluting solution for decreasing the viscosity thereof, water or a polar solvent (methyl alcohol, etc.) or the like is used. The water soluble slurry waste fluid is necessarily concentrated again by distillation, etc. and hence in consideration of combustibility as the diluting solution water is preferably used without the use of the organic solvent. The water soluble slurry waste fluid 2 having low viscosity of 30 mP·s or less is then separated into available abrasive grains (P) and waste liquid (N1) consisting of a SS (suspended solid) part (or a floating solid part) and a liquid part (water soluble coolant+water). That is, the step (b) where the water soluble slurry waste fluid of low viscosity is separated into the available abrasive grains (P) and the waste liquid (N1) consisting of a SS part and a liquid part (FIGS. 1 and 2) is carried out.

In this separating operation of the step (b), a cyclone type separator 4 such as a liquid cyclone is preferably usable. In the liquid cyclone, a working fluid containing in a suspension state abrasive grains smaller than predetermined grain size, for instance, of 8 μm or less is discharged from an upper outlet and a working fluid containing in a suspension state abrasive grains larger than predetermined grain size, for instance, of 8 μm or more is discharged from a lower outlet (for example, Japanese Patent Publication No. 7-41535). For this liquid cyclone type separating machine, a SRS system (tradename for a liquid cyclone type separating machine manufactured by HITACHI ZOSEN METAL WORKS CO., LTD.) is preferably usable. In the case where the separating operation is conducted by the use of a centrifugal separating machine which is generally used, the separated abrasive grains contain minute abrasive grains which are smaller than the available abrasive grains in terms of their grain size and hence are not reusable.

However, with the separation by the use of the liquid cyclone, the separated abrasive grains contain advantageously available abrasive grains (P) alone which can be reused but do not contain minute abrasive grains which are smaller than the available abrasive grains in terms of their grain size and can not be reused. For the water soluble slurry waste fluid subjected to the system of the present invention, the available abrasive grains (P) denotes reusable abrasive grains larger than predetermined grain size, for instance, of 8 μm or more. The minute abrasive grains having grain size, for instance, of less than 8 μm are unsuitable to reuse.

Figure 2:
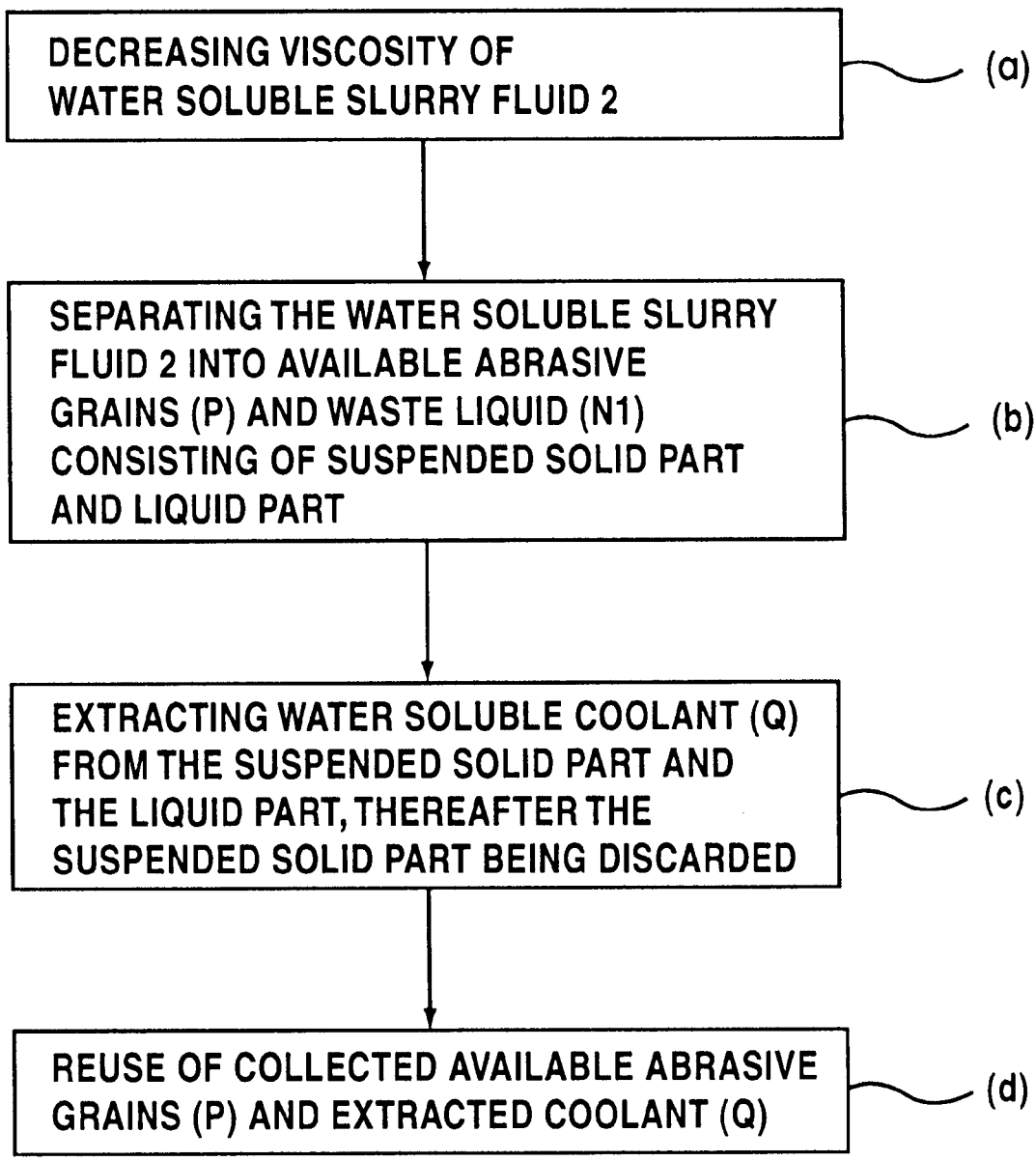
FIG. 2 is a flow chart showing one example of order of the steps in the system for reusing water soluble slurry waste fluid.

The waste liquid (N1) consisting of the SS part (the suspended solid part) and the liquid part from the separator 4 is subjected to coagulation separation, concentration and solid-liquid separation with a centrifugal separator to extract water soluble coolant (Q). That is, the step (c) where the water soluble coolant (Q) is extracted from the waste liquid (N1) consisting of the water soluble coolant (Q), the suspended solid part and the liquid part and thereafter the suspended solid part is discarded as useless sludge (L) is carried out (FIG. 2). In the example of the steps shown in FIG. 2, the collected available abrasive grains (P) and the extracted water soluble coolant (Q) are reused.

By the way, the waste liquid (N1) consisting of the water soluble coolant (Q), the SS (suspended solid) part and the liquid part is not completely separated without a coagulating agent even if using a usual centrifugal separation with a high speed rotation of 14,000 G.

Figure 3:
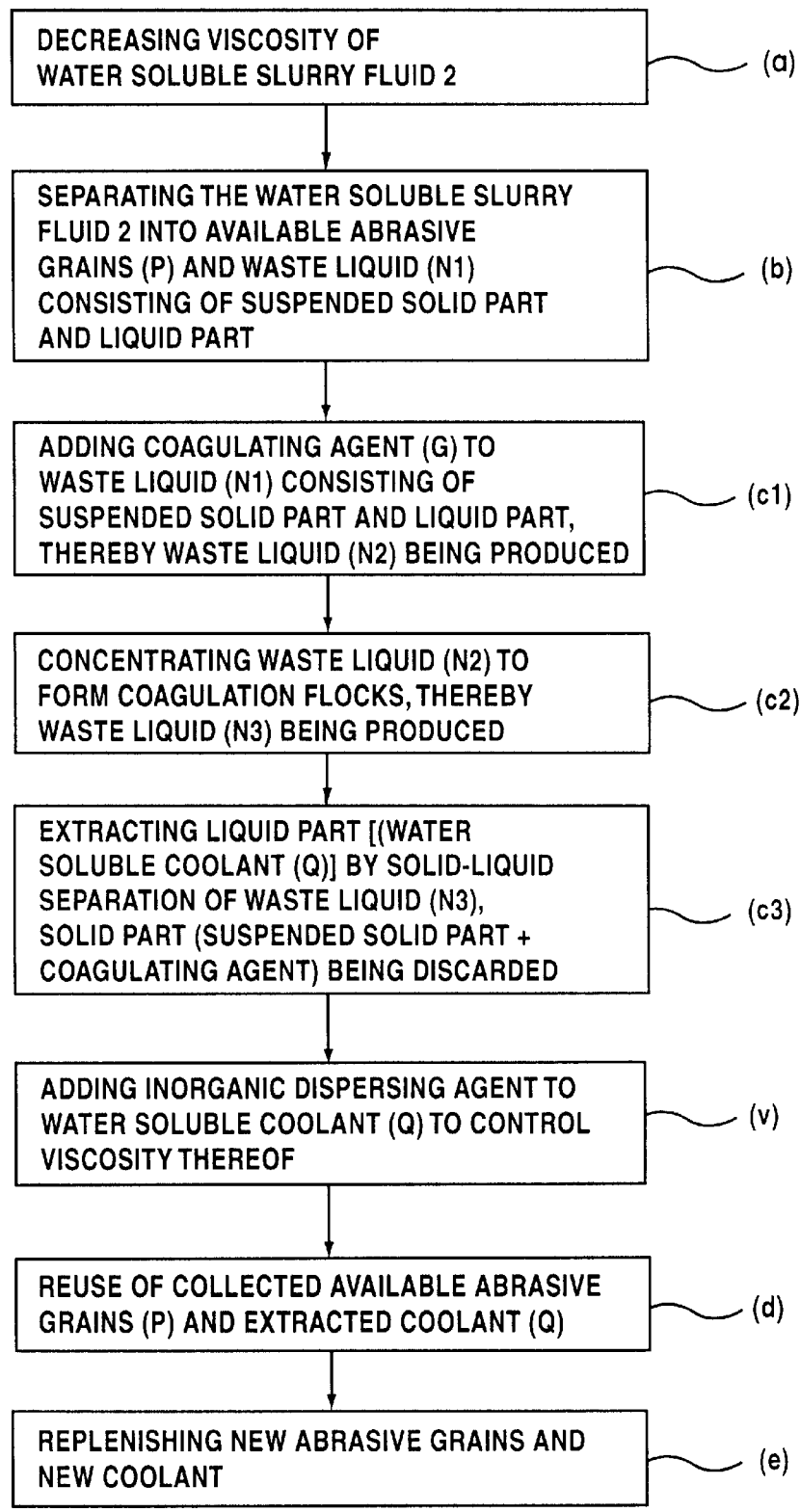
FIG. 3 is a flow chart showing another example of order of the steps in the system for reusing water soluble slurry waste.
Figure 4:
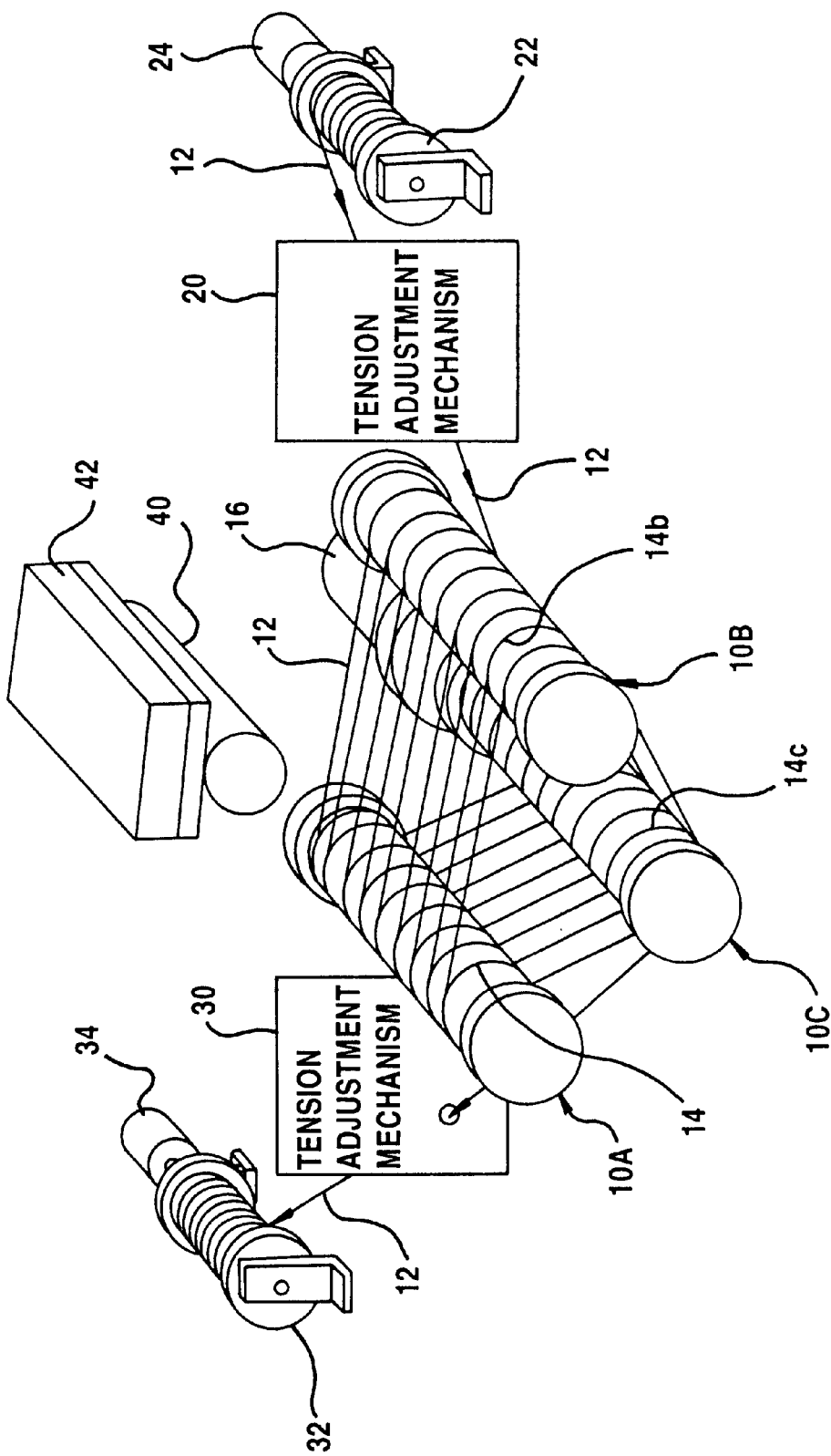
FIG. 4 is a diagrammatical perspective view of a main portion of a wire saw slicing apparatus.

The step (c) is preferably composed of the sub-steps (c1)~(c3) as shown in FIG. 3. First, in the sub-step (c1), the waste liquid (N1) consisting of the SS (suspended solid) part and the liquid part is turned to coagulating agent added waste liquid (N2) by adding a coagulating agent (G) thereto. This coagulating agent added waste liquid (N2) can be separated with a centrifugal separator 6. As the coagulating agent added to the waste liquid (N1) an organic coagulating agent is effectively usable. However, when using the organic coagulating agent, pH (hydrogen ion concentration) of the waste liquid (N1) is necessarily adjusted. The coagulating agent may change the characteristics of the water soluble coolant waste liquid. In the present invention, bentonite which is a component of the water soluble coolant can be used as an inorganic coagulating agent so that the SS (suspended solid) part and the liquid part are separated without the change of the liquid characteristics.

As for the water soluble slurry waste fluid 2 to which the present invention is applied, when the temperature thereof is 60° C. or above and the rate of moisture thereof is 60% or less, it is confirmed that bentonite acts as a coagulating agent. Therefore, coagulation separation and concentration of the liquid part of the coagulating agent added waste liquid (N2) can be carried out by distillation 6 concurrently.

Next, in the sub-step (c2), the coagulating agent added waste liquid (N2) is turned to concentrated waste liquid (N3) consisting of the SS (suspended solid) part, the water soluble coolant (Q) and the coagulating agent (G) by coagulation separation and concentration through distillation of the liquid part. Then, in the sub-step (c3), the concentrated waste liquid (N3) is effectively subjected to solid-liquid separation with a centrifugal separator 8. Since the stability of flocks coagulated in the coagulation separation processing depends greatly upon the liquid temperature, when passing the waste liquid (N3) to the centrifugal separator 8, the temperature thereof is necessarily kept 60° C. or above.

With the above-mentioned solid-liquid separation, the concentrated waste liquid (N3) is separated into the water soluble coolant (Q) and the suspended solid part and the coagulating agent which are adsorbed to the coagulated flocks. The viscosity of the extracted water soluble coolant (Q) is controlled by adding an inorganic dispersing agent (D) [step (v)] and then the extracted water soluble coolant (Q) is reused as a regenerated water soluble coolant [step (d)]. The separated solid part consisting of the suspended solid part and the coagulating agent is discarded as useless sludge (L).

In the case where a distillation method is used to concentrate and remove the liquid part, even if a vacuum distillation method for instance is adopted, the liquid part is necessarily warmed. In usual processing, it is necessary to prevent the water soluble coolant from oxidation by adding an antioxidant to the liquid part. For the water soluble slurry waste fluid to which the present invention is applied, it is confirmed that there was no change after distillation operations of five times in the characteristics of the water soluble coolant (Q) of new liquid state which is repeatedly distilled under the condition of 60–100° C. without an antioxidant. The water soluble slurry waste fluid which can be distilled without an antioxidant is useful for not changing the characteristics thereof.

In the above-mentioned explanation, an example wherein a distillation method is applied to the coagulating agent added waste liquid (N2) is shown. The following process is also applicable. The coagulating agent added waste liquid (N2) is first subjected to solid-liquid separation using centrifugal separation to separate into the liquid part [the water soluble coolant (Q)+water] and useless sludge (the suspended solid part+the coagulating agent), next a distillation method is applied to the liquid part [water soluble coolant (Q)+water] to remove water, and then the water soluble coolant (Q) is extracted.

By mixing the collected available abrasive grains (P) and the extracted and regenerated water soluble coolant (Q1), a water soluble slurry 10 having properties as good as new can be produced and reused. That is, the reuse of the collected available abrasive grains and the extracted water soluble coolant [step (d)] is carried out.

According to the above-mentioned processing, the water soluble slurry waste fluid 2 is separated into the available abrasive grains (P), useless sludge (L), water soluble coolant (Q) and water. The available abrasive grains (P) [together with new abrasive grains (P1) as occasion demands] are mixed with water soluble coolant [new water soluble coolant (Q2) and/or regenerated water soluble coolant (Q1)] under a predetermined mixing ratio [step(e)] and regenerated as water soluble slurry which is provided to a slicing operation with the wire saw slicing apparatus.

On the other hand, the extracted water soluble coolant (Q) is turned to regenerated water soluble coolant (Q1) by adding the solid part lost during a coagulation precipitation operation and controlling the viscosity thereof, whereupon the regenerated water soluble coolant (Q1) is reused as a raw material of a water soluble slurry. According to the present invention, the substances which are exhausted from the water soluble slurry waste fluid is only the useless sludge which is finally exhausted therefrom. The volume of the exhausted substances to be treated in a waste water disposal plant is reduced to ⅕ (by weight) compared with that of the conventional water soluble slurry waste fluid.

The use of the water soluble slurry as a working fluid when slicing with a wire saw slicing apparatus leads to an effective solution to the environmental problems because it is unnecessary to use an organic solvent for cleaning a workpiece.

As described above, the present invention is capable of reducing a disposal cost due to a reduction of a load to a waste water disposal plant by effectively reusing water soluble slurry waste fluid, and making a contribution to a reduction of a total slicing cost by reusing abrasive grains and water soluble coolant.

Obviously, various minor changes and modifications of the present invention are possible in the light of the above teaching. It is therefore to be understood that within the scope of appended claims the invention may be practiced otherwise than as specifically described.

What is claimed is:

1. A process for reusing water soluble slurry waste fluid used when semiconductor ingots are sliced with a wire saw slicing apparatus, which comprises the steps of:
   (a) decreasing viscosity of water soluble slurry waste fluid
   (b) separating the water soluble slurry waste fluid of low viscosity into separated abrasive grains and waste liquid consisting of a suspended solid part and a liquid part;
   (c) extracting water soluble coolant from the waste liquid consisting of the suspended solid part and the liquid part with a coagulation separating operation including the sub-steps of:
   (c1) adding bentonite as a coagulating agent to the waste liquid consisting of the suspended solid part and the liquid part;
   (c2) concentrating the liquid part from the waste liquid added with the coagulating agent to form coagulation flocks;
   (c3) extracting the water soluble coolant by solid-liquid separation of the waste liquid consisting of the suspended solid adsorbed to the coagulation flocks and the concentrated liquid part,
   thereafter discarding the suspended solid part as useless sludge; and
   (d) reusing the separated grains and the extracted water soluble coolant.

2. A process for reusing water soluble slurry waste fluid according to claim 1, wherein when reusing the mixture of the separated abrasive grains and the extracted water soluble coolant, new abrasive grains and new water soluble coolant are replenished to make up for any shortage thereof.

3. A process for reusing water soluble slurry waste fluid according to claim 1, further comprising adjusting the viscosity of the extracted water soluble coolant by adding a dispersing agent thereto.

4. A process for reusing water soluble slurry waste fluid according to claim 2, further comprising adjusting the viscosity of the extracted water soluble coolant by adding a dispersing agent thereto.

5. A process for reusing water soluble slurry waste fluid according to claim 3, wherein the dispersing agent is an inorganic dispersing agent.

6. A process for reusing water soluble slurry waste fluid according to claim 4, wherein the dispersing agent is an inorganic dispersing agent.

7. A process for reusing water soluble slurry waste fluid according to claim 1, wherein the viscosity of the water soluble slurry waste fluid which is decreased in step (a) is 30 mPa·s or less.

8. A process for reusing water soluble slurry waste fluid according to claim 1, wherein the viscosity of the water soluble slurry waste fluid which is decreased in step (a) is within the range of 20 to 30 mPa·s.

9. A process for reusing water soluble slurry waste fluid according to claim 1, wherein step (a) is conducted by adding a diluting solution to the water soluble slurry waste fluid.

10. A process for reusing water soluble slurry waste fluid according to claim 9, wherein the diluting solution is water and/or a polar solvent.

11. A process for reusing water soluble slurry waste fluid according to claim 1, wherein step (a) is conducted by warming the water soluble slurry waste fluid or the diluted water soluble slurry waste fluid added with the diluting solution to the temperature of 40° C. or above.

12. A process for reusing water soluble slurry waste fluid according to claim 1, wherein step (b) is carried out with a liquid cyclone.

13. A process for reusing water soluble slurry waste fluid according to claim 1, wherein the solid liquid separation is by centrifugal separating.

14. A process for reusing water soluble slurry waste fluid according to claim 1, wherein steps (c1), (c2), and (c3) are conducted at 60° C. or above.

* * * * *